T. D. OSBORNE.
Chromatic Printing Block.

No. 203,490. Patented May 7, 1878.

Witnesses:
R. Dieterich
Frank H. Duffy

Inventor:
Thomas D. Osborne
Per C. H. Watson & Co. Attorneys.

UNITED STATES PATENT OFFICE.

THOMAS D. OSBORNE, OF LOUISVILLE, KENTUCKY.

IMPROVEMENT IN CHROMATIC-PRINTING BLOCKS.

Specification forming part of Letters Patent No. 203,490, dated May 7, 1878; application filed March 28, 1878.

*To all whom it may concern:*

Be it known that I, THOMAS D. OSBORNE, of Louisville, in the county of Jefferson and State of Kentucky, have invented certain new and useful Improvements in Printing in Two or More Colors; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to printing in two or more colors; and it consists in so constructing the form that certain portions thereof will be yielding, the object being to print in two or more colors at one impression, as will be hereinafter more fully set forth.

Figure 1:
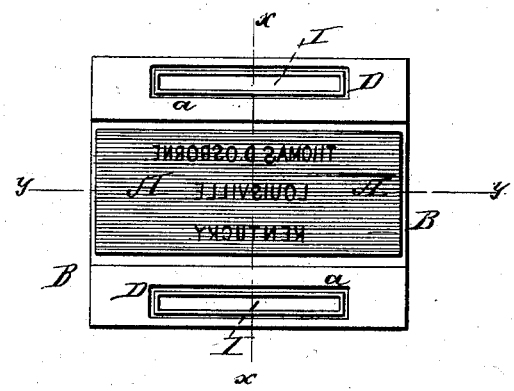
Figure 2:
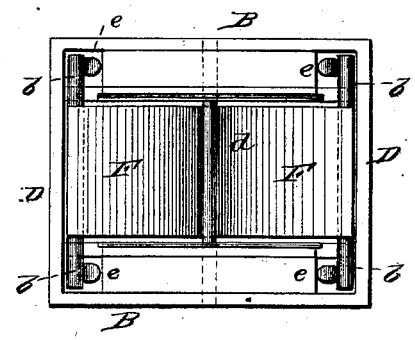
Figure 3:
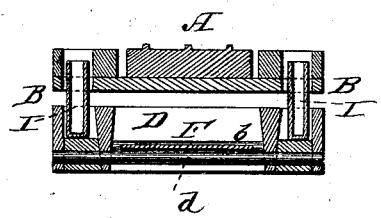
Figure 4:
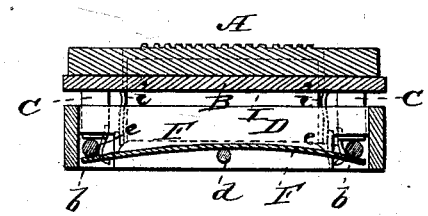

In the annexed drawings, to which reference is made, and which fully illustrate my invention, Figure 1 is a plan view. Fig. 2 is a bottom view. Fig. 3 is a section on line $x\ x$ of Fig. 1; and Fig. 4 is a section on line $y\ y$, Fig. 1.

A represents a stereotype or electrotype plate, secured in any suitable manner upon a bed, B. This bed has openings $a\ a$, of any desired size or shape, on any or all sides of the plate, and the bed is provided with feet C C, which project downward in the corners of a frame, D, where they rest upon the ends of two rods, $b\ b$. These rods are secured to the ends of a broad and strong flat spring, F, which rests upon a central rod or bar, $d$, in the frame D.

The feet C are provided with suitable spring-catches $e$, to hold on to the rods $b$ in such a manner as to prevent any accidental displacement of the bed B, and yet admit of said bed being easily removed from the frame when desired.

In the frame D are arranged suitable ink-fountains I I, held in place by springs $i$ or other suitable means. In each fountain I propose to insert a metal strip, or anything else that will answer the purpose intended, and also arrange cotton, or its equivalent, with such strip, in such a manner as to supply ink thereto by capillary attraction.

It will be understood that the plate A stands above the edges of the strips in the fountains I, so that when the inking-rollers pass over the form no ink will be left on said strips. Then, when the impression is taken, the plate A and bed B yield sufficiently to allow said strips to get to the surface and make their marks upon the paper at the same time that the impression is taken of the plate A. Thus, if different-colored inks be used in the fountains I, a print will be produced in two or more colors at one impression.

In place of the strips mentioned I may arrange the device in such a manner that designs, figures, types, &c., may be used.

This invention can be used for a variety of different purposes—for instance, in simply making marks at the sides, top, or bottom, or all of the sides of an advertisement in a newspaper or other publication, to call attention to the same; or it may be used to print different parts of the same advertisement, paragraph, or piece in two or more colors, the main purpose of the invention being to print in two or more colors at one impression.

To this end the construction of the parts will, of course, be varied according to circumstances; and hence I do not limit myself to the precise construction of the parts as shown and described.

Having thus fully described my invention, what I claim as new, and desire to secure by Letters Patent, is—

1. A form for printing made in two or more divisions or sections, one or more sections being stationary and provided with separate inking devices, and one part or section being yielding, to be inked by the ordinary rollers, and all the sections coming to the same surface when the impression is being taken.

2. The combination of a stationary frame, carrying portion of the form with its independent inking devices, and a yielding bed carrying another portion of the form, substantially as and for the purposes herein set forth.

In testimony that I claim the foregoing as my own I have hereto affixed my signature in presence of two witnesses.

THOS. D. OSBORNE.

Witnesses:
C. H. WATSON,
FRANK GALT.